Dec. 22, 1959     J. A. WILSON, JR     2,918,075
LIQUID EXPULSION VALVE ASSEMBLY
Filed April 11, 1957
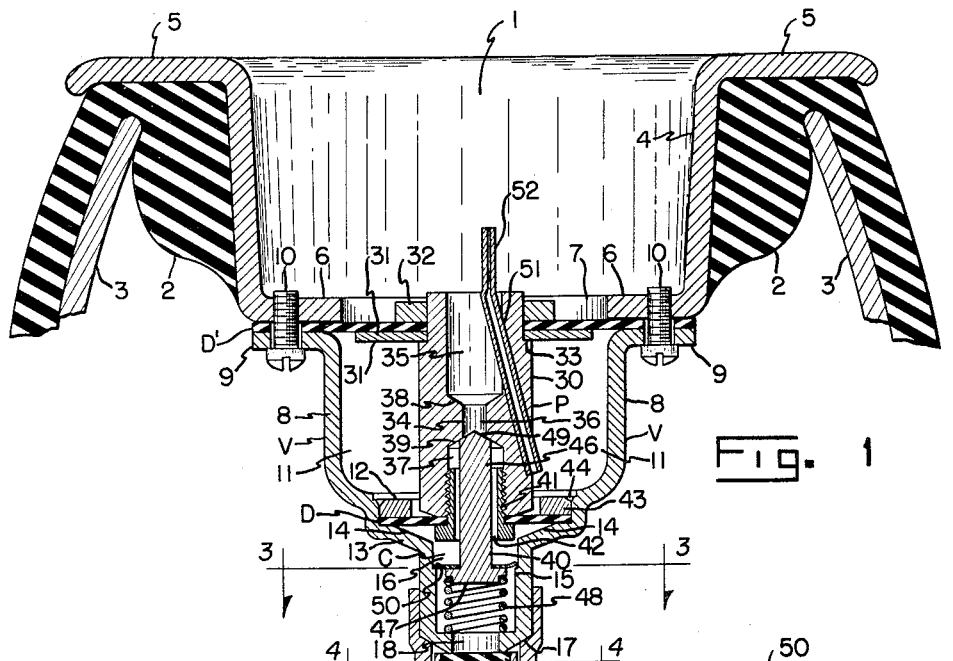
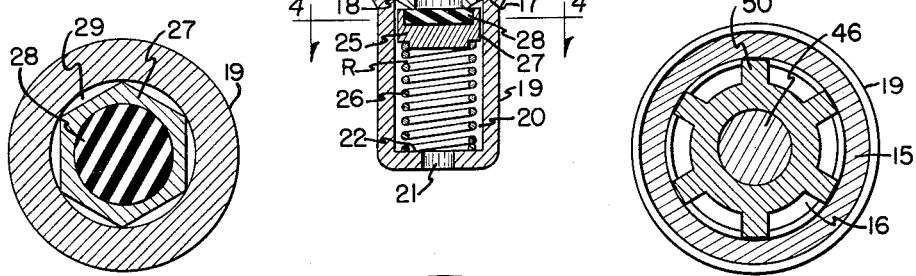
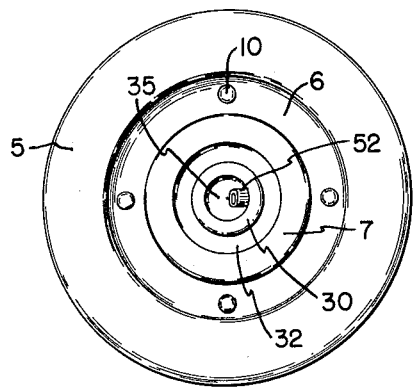
INVENTOR.
JESSE A. WILSON, JR
BY
Philip H. Sheridan
ATTORNEY United States Patent Office 2,918,075
Patented Dec. 22, 1959

2,918,075

LIQUID EXPULSION VALVE ASSEMBLY

Jesse A. Wilson, Jr., Littleton, Colo., assignor to C. A. Norgren Co., Englewood, Colo., a corporation of Colorado Application April 11, 1957, Serial No. 652,297

13 Claims. (Cl. 137—204)

This invention relates to an improved liquid expulsion valve assembly operably connectable to a chamber containing a compressible fluid exposed to varying and sudden pressure changes whereby any non-compressible fluid accumulation within the chamber will be expelled therefrom without expelling any compressible fluid. More particularly, the assembly of this invention is an improvement upon the liquid expulsion valve unit disclosed and claimed in the Jesse A. Wilson, Jr. U.S. patent application Serial No. 642,172, filed February 25, 1957, and entitled "Pneumatic Suspension System and Liquid Expulsion Valve Therefor," said application and the present invention having been assigned to a common assignee.

The present assembly likewise may be used in combination with an air bag of a pneumatic suspension system or in air tool lines and pneumatic cylinder piston combinations generally wherein there is provided a chamber containing a compressible fluid which is exposed to instantaneous or sudden pressure variations. As in said application, hereinafter reference in the specification will be made to "air bag," "water or liquid expulsion" and "compressed air," but it is to be understood that various gaseous media and compressible fluids in general that bear or carry moisture condensible into non-compressible fluid as distinguished from dry air or dry nitrogen are to be included. The valve unit of said application has generally been found to be quite satisfactory, but there is a need for a similar valve assembly which may be more readily manufactured and which incorporates several additional advantages that will be pointed out hereinafter and thus is the reason for the present design which has all of the objects and advantages of the valve unit of said application.

It is an object of this invention to provide a liquid expulsion valve assembly of the type described which is more dependable than previous such units and which is more adaptable for manufacture.

It is also an object to provide a liquid expulsion valve assembly for use in combination with a compressible air chamber which has all of the objects and advantages of said application including the function of removing and expelling automatically from said chamber and without expelling air any liquid that accumulates therein.

A further object is to provide an assembly as described in the preceding paragraph which insures that there will be no locking up of the parts thereof due to any possible liquid flooding or sudden accumulation of liquid.

Yet another object is to provide an assembly which incorporates in addition to a piston for compressing the compressible fluid and a relief valve operable upon the compressible fluid being at a predetermined pressure to permit discharge of accumulated liquid, a liquid discharge control valve which functions to control the entrance of any accumulated liquid within the discharge chamber of the assembly.

Other objects and advantages of the invention will be apparent upon considering the detailed description in conjunction with the drawings wherein like numerals represent similar parts throughout, wherein a preferred embodiment is illustrated, and wherein:

Figure 1 is an enlarged vertical sectional view of the valve assembly and a portion of the chamber with which it may be operably associated, said view being taken on any straight plane passing through the center of the assembly;

Figure 2 is a reduced top view of the apparatus shown in Figure 1;

Figure 3 is an enlarged sectional view taken along the lines 3—3; and

Figure 4 is an enlarged sectional view taken along the lines 4—4.

The essence of this invention resides in the construction and function of the liquid expulsion valve assembly and for purposes of illustration only it is being shown as used in combination with a pneumatic suspension system of the type disclosed in said pending application. Here again it is to be understood that in place of the compressed air chamber partially illustrated, the assembly may be incorporated in combination with any chamber containing a compressible fluid which is exposed to instantaneous pressure variations and wherein there is apt to be liquid accumulation in the chamber which would interfere with the operation. Bearing this in mind, numeral 1 represents a portion of the chamber containing the compressible fluid such as compressed air, while numeral 2 represents a flexible and resilient medium such as rubber or neoprene, and numeral 3 represents a circular hollow bracket forming a support. The mediums 2 are connected to an open bottom cup 4 having a top annulus 5 and an interior inwardly directed circular flange 6 which is open as at 7. The construction described thus far is identical with that shown in said pending application and for further description thereof including chamber 1 and the function thereof, reference may be made to this pending application. The chamber 1 is filled with a compressible fluid and, as in said pending application, is designed to support a load, such as that of a vehicle, as well as varying loads caused by travel over rough terrain. For purposes of explanation, let it be assumed that with a static load on chamber 1 the pressure of the compressed air or compressible fluid therein is 90 p.s.i. and the varying loads will cause the internal pressure to increase to a maximum of 200 p.s.i. when the fluid is compressed to a maximum and will cause during the lowest decrease in external load expansion of the compressible fluid and a decrease of the internal pressure thereof to a minimum of 60 p.s.i. These maximum and minimum air pressures are merely illustrative or, as explained in said pending application, are the maximum and minimum air pressures expected during extreme operations during travel of a vehicle over various terrain and are occasioned for the most part by instantaneous impacts. During continued operation and replenishing of the air supply, as explained in my copending application, water or liquid will accumulate within chamber 1 and bearing in mind that this liquid accumulation is a non-compressible fluid, it will be apparent that any substantial accumulation thereof will interfere with the desired operating characteristics of the chamber 1 and, as in my said application, the purpose of the present liquid expulsion valve assembly generally represented by the letter V, is to overcome this by expelling water without expelling the compressible fluid or in other words without loss of any chamber air pressure, assuming the compressible fluid is compressed air.

The details of assembly V will now be described and unless specifically otherwise mentioned, all of the parts are preferably metallic. The assembly includes an outer circular body 8 which is provided at its top with an annular flange 9 which in turn is integrally connected by any suitable means such as a plurality of screws 10 to the circular flange 6 of the open bottom cup 4. Between these flanges there is positioned a diaphragm D' which will be more fully explained hereinafter, but it will be noted that this diaphragm functions as a fluid seal at the points of connection of flanges 6 and 9. Body 8 is enlarged adjacent its top to form the circular space 11 and then it is shaped to form the circular space 12 and from the bottom thereof it tapers downwardly in inverted conical-like fashion as at 13 to form an interior wall 14 and from this depends the hollow circular wall 15 forming a substantially circular space 16. The wall or portion 15 terminates at its bottom in a depending part 17 which is provided with a discharge opening 18 and which forms a seat for a relief valve generally represented at R. By any suitable means, such a a press fit, secured to the portion 15 is a cap member 19 which is hollow to provide a bore 20 and at its bottom or base 22 is provided with an outlet port or opening 21, the relief valve R being contained within bore 20.

Considering Figures 1 and 4 in particular, relief valve R includes a valve assembly 25 which is normally biased into engagement with seat 17 by spring means 26. As shown in Figure 4, the assembly 25 consists of a hexagonal-shaped disc holder 27 which contains a rubber disc 28 for engaging seat 17 to form a fluid seal therewith. The spring 26 engages at one end the under surface of holder 25 and at its other end the interior face of base 22 of cap 19. The disc holder 27 may assume various shapes, such as that of a triangle or rectangle, as long as such provides with the interior wall of cap 19 spaces 29 which permit, when 28 is disengaged from 17, communication between bores 16 and 20 as should be apparent.

A piston P is carried or mounted for conjoint movement with the diaphragm D' and a second diaphragm D. This piston includes a main body 30 which at its top is connected to an annular or circular diaphragm plate 31 by any suitable means such as a washer 32 which may be press fit into the position shown to suitably clamp body 30 to the diaphragm D', it being noted that adjacent the top of the piston there is provided a shoulder 33 for receiving the plate 31. The size of plate 31 may be varied considerably and as desired to vary the effective area of the diaphragm D' and, as is apparent, flexible diaphragm D' is exposed to movement by pressure variations within space 1. Piston 30 is hollow and substantially intermediate thereof is provided with an inwardly directed annular projection 34 which is also hollow and which forms the three axially aligned bores 35, 36 and 37. The ends of projection 34 are provided with partial conical walls 38 and 39, the former being for directing any fluid in bore 35 into bore 36 and the latter being for the purpose of forming a seat for a discharge control valve generally represented by 40.

Attached to the bottom of piston 30 by screw threads or any suitable means is a clamp 41 which has a hollow interior as at 42 and which functions as a diaphragm clamp to secure the second diaphragm D to the piston. This diaphragm D is also secured integrally to body 8 by any suitable means, such as a retaining washer 43 that is staked in place as at 44. It will be seen in view of the foregoing that piston 30 is mounted for conjoint movement with diaphragms D' and D and the downward reciprocal movement of piston 30 is limited by interior wall 14 of portion 13 being engaged by diaphragm D.

The discharge control valve 40, which may be made of any suitable material such as nylon, includes a main upstanding portion 46 (of smaller cross section than 42) having at its top a conical tip 49 which is arranged to engage wall 39 and form a fluid seal therewith. At its bottom the portion 46 has a circular flange or base 47 and interposed between this base and depending part 17 is suitable spring means 48 which functions to bias portion 46 upwardly to maintain wall 39 and the conical tip 49 engaged whereby fluid cannot pass from bore 36 to bore 37. The upward maximum stroke or position of control valve 40 is limited by any suitable means, such as a truarc ring 50, more clearly shown in Figure 3, engaging and more or less biting into the interior wall of annular part 15.

There is provided a pressure equalizing tube or bleeder 51 for balancing and equalizing the compressible fluid pressure in chamber 11, or in other words for maintaining this pressure the same as the pressure within the chamber 1 and this tube 51 is provided with an extended portion 52 whereby any liquid accumulation in chamber 1 will be prevented from entering space 11 and thus it can be seen that even if there is a sudden flood of liquid within space 1 there will be no locking up of the valve unit V which could well occur if fluid could enter space 11.

In considering the operation of the apparatus, let it be assumed for the moment that 1 represents the air bag proper of a pneumatic suspension apparatus, as described in my co-pending application, and let it also be assumed that bore 37, bore 16 and the normal space between wall 14 and diaphragm D constitutes a chamber C within which the piston is operable for limited reciprocating movement. Also assume that the static load of the vehicle results in the compressed air supplied within bag 1 being at 90 p.s.i. and the compressed air within space 11 would also be at 90 p.s.i., due to equalizing tube or bleeder 51 allowing air to pass directly from space 1 into space 11. This bleeder 51 in effect prevents the diaphragms D' and D from moving downwardly unless that is a sudden or instantaneous impact upon diaphragm D' as a result of a large pressure change within space 1. Of course, there is a compressed air or compressible fluid supply means for chamber 1 and periodic replenishing to maintain the static pressure will occur.

Assuming there is such an instantaneous impact on diaphragm D', then this diaphragm and piston 30 and diaphragm D will be forced downwardly from the position shown in Figure 1 until diaphragm D engages the wall 14 to limit the stroke and, of course, the diaphragms and piston will return to the normal position once the bleeder balances pressures between spaces 1 and 11, although of course the diaphragms and the piston will be moved upwardly of the position shown in Figure 1 when, for example, they are returning to normal position and the load functions to decrease the internal pressure of chamber 1 below the static pressure. A downward force by the piston and diaphragms applies pressure to the medium within chamber C and due to the relative areas of diaphragm D' and piston 30 and diaphragm D, this pressure within chamber C will greatly exceed the pressure within space proper 1. For example, an instantaneous pressure on diaphragm D' of 200 p.s.i. will cause the piston P to move to the end of its stroke and could result in the medium within chamber C being under a pressure of about 270 p.s.i. The load of spring 26 would be designed so that with air only within chamber C and the piston in its lower limit, the maximum extreme pressure resulting from air or compressible fluid compression within chamber C will not force the disc 28 off of its seat, or in other words the relief valve R is set to open only at a pressure (say 275 p.s.i.) exceeding the maximum pressure that can be exerted by the compressible fluid compressed in chamber C by the piston P. However, any greater pressure in chamber C will open the relief valve R and thus any liquid with air in chamber C will result in sufficient pressure, when the piston is approaching or at the end of its downward stroke, to open the valve R. This is so because liquid will have displaced part of the air volume in chamber C, thus causing the air to be compressed to a greater pressure, say 320 p.s.i. Assuming there is liquid in chamber C, then it will be discharged into the atmosphere through port 18, passages 29, bore 20 and port 21 until the pressure in chamber C reaches a value just less than that for which the relief valve R was set, at which point valve R closes. It should be kept in mind that the liquid should be at the bottom of chamber C, due to its weight as compared to that of air.

As to the means for causing liquid in chamber 1 to reach chamber C, this will now be described and of course it will be assumed that water has accumulated in space 1. Also, it should be pointed out that it is expected to operate below static pressure about as often as above normal or static pressure. In the event no air from space 1 is within chamber C, there will be such as soon as operations start and check valve 40 opens. For reasons which will become apparent from referring to my said co-pending application, any liquid will eventually enter bore 35 and will remain in this bore and bore 36 until valve 40 opens, or in other words until surfaces 49 and 39 are disengaged. Due to spring 48, valve 40 is maintained as shown in Figure 1 under static load and thus no liquid can enter chamber C. During downward movement of the diaphragm piston assembly, the valve 40 likewise travels, or in other words, because of spring 48 and the arrangement of the parts there is downward conjoint movement. This same conjoint movement also results, due to the designed strength of spring 48, during the travel of the diaphragm piston assembly upwardly to its static position, but the return conjoint movement is limited as the valve 40 has its flange 47 engaged with the ring or stop means 50 at this static position. Thus, when the load results in air pressure within chamber 1 being below static, at the time the diaphragm piston assembly reaches static position during its return stroke, this assembly will continue upwardly independent of the valve 40 and beyond the position of Figure 1, whereupon the walls 39 and 40 will be separated and any liquid within bore 36 may trickle or otherwise pass into chamber C. Of course, thereafter the valve 40 will again be closed as soon as static load is reached and thus it can be seen that the valve 40 functions to isolate the liquid from chamber C until the load results in chamber 1 air pressure being below static pressure. Of course, while it is essential that valve 40 be closed during the downward or compression stroke of piston P, it is not necessary that there be conjoint movement of 40 and the piston P during the return stroke until static position is attained and thus the invention is by no means to be limited in this sense.

From the foregoing description it will be apparent that I have invented a liquid expulsion assembly that achieves the objects enumerated. Although the valve unit V is shown and described as having a special use in connection with a pneumatic suspension system, its principles may be used for other purposes and in other combinations as indicated. Thus, being aware of possible additional modifications and uses, I desire it to be understood that the scope of the invention is not to be limited except in accordance with the terms of the appended claims and equivalents thereof.

What is claimed is:
1. A valve assembly comprising a chamber normally containing a supply of compressible fluid, a reciprocating piston operable within said chamber to cause pressure variations of said fluid stop means for limiting said reciprocating movement in the direction whereby the fluid pressure in the chamber is increased, a relief valve through which any non-compressible fluid in said chamber may be discharged from said chamber operably associated with said chamber, said relief valve being set to open at a pressure exceeding the maximum pressure that can be exerted by the compressible fluid compressed in said chamber by said piston when there is only compressible fluid within said chamber, and means including a discharge control valve for introducing a non-compressible fluid into said chamber whereby the space in said chamber for the compressible fluid is reduced and the compressible fluid when compressed will exceed a pressure at which the relief valve opens, said control valve being connected for conjoint movement with said piston during reciprocating movement of said piston in its compression stroke and for relative movement with said unit during its return stroke.

2. An assembly as defined in claim 1 wherein there is provided at least one diaphragm for causing reciprocating movement of said piston.

3. An assembly as defined in claim 2 wherein there is provided means operably associated with said diaphragm for causing the piston to apply only momentary and sudden pressure changes to the compressible fluid.

4. An assembly as defined in claim 3 wherein there is provided a pair of diaphragms connected for conjoint movement with the piston, said diaphragms being spaced apart to form a space sealed to compressible and non-compressible fluids, and the means for causing the piston to apply only momentary pressure changes comprising a bleeder tube communicating with the space and the supply of compressible fluid.

5. An assembly as defined in claim 1 wherein the control valve is spring biased into engagement with said piston during said conjoint movement and there is provided stop means for limiting the movement of said control valve during the return stroke of said piston.

6. An assembly as defined in claim 5 wherein said piston is hollow and provided on its interior wall with a control valve seat, said control valve extending at least partially into the hollow of said piston, said piston being operable from a normal static position to a maximum downward compression stroke and a return upward stroke through and above the static position, said stop means being supported to cooperate with and be engaged by said control valve when the piston moves above the static position during its return stroke.

7. In combination, a first chamber containing a volume of compressible fluid exposed to pressure variations, a second chamber normally containing a supply of the compressible fluid, a reciprocating piston operable within said second chamber to cause pressure variations of the compressible fluid therein, stop means for limiting said reciprocating movement in the direction whereby the fluid pressure in the chamber is increased, a relief valve operably associated with said second chamber and through which any non-compressible fluid in said second chamber may be discharged therefrom without loss of compressible fluid pressure in both chambers, said relief valve being set to open at a pressure exceeding the maximum pressure that can be exerted by the compressible fluid compressed in said second chamber by said piston when there is only compressible fluid within said second chamber, and means including a discharge control valve for introducing a non-compressible fluid from said first chamber into said second chamber whereby the space in said second chamber for the compressible fluid is reduced and the compressible fluid when compressed will exceed a pressure at which the relief valve opens.

8. A combination as defined in claim 7 wherein said control valve is connected for conjoint movement with said piston during reciprocating movement of said piston in its compression stroke and for relative movement with said piston during its return stroke.

9. A combination as defined in claim 8 wherein the piston is operable by at least one diaphragm directly exposed on one side thereof to pressure variations within said first chamber.

10. A combination as defined in claim 9 wherein there is provided means operably associated with said diaphragm for causing the piston to move only upon instantaneous pressure changes to the compressible fluid in the first chamber.

11. A combination as defined in claim 9 wherein the control valve is spring biased into engagement with said piston during said conjoint movement and there is provided stop means for limiting the movement of said control valve during the return stroke of said piston.

12. A combination as defined in claim 11 wherein said piston is hollow and provided on its interior wall with a control valve seat, said control valve extending at least partially into the hollow of said piston, said piston being operable from a normal static position a maximum downward compression stroke and a return upward stroke through and above the static position, said stop means being supported to cooperate with and be engaged by said control valve when the piston moves above the static position during its return stroke.

13. A valve assembly comprising a chamber normally containing a supply of compressible fluid, a reciprocating piston operable within said chamber to cause pressure variations of said fluid, stop means for limiting said reciprocating movement in the direction whereby the fluid pressure in the chamber is increased, a relief valve through which any non-compressible fluid in said chamber may be discharged from said chamber operably associated with said chamber, said relief valve being set to open at a pressure exceeding the maximum pressure that can be exerted by the compressible fluid compressed in said chamber by said piston when there is only compressible fluid within said chamber; and means including a discharge control valve for introducing a non-compressible fluid into said chamber whereby the space in said chamber for the compressible fluid is reduced and the compressible fluid when compressed will exceed a pressure at which the relief valve opens.

References Cited in the file of this patent

UNITED STATES PATENTS

| | | |
|---|---|---|
| 702,157 | Schreidt | June 10, 1902 |
| 1,278,118 | Demarest | Sept. 10, 1918 |
| 2,619,985 | Wilkerson | Dec. 2, 1952 |